(12) United States Patent
Furuya

(10) Patent No.: US 6,520,099 B1
(45) Date of Patent: Feb. 18, 2003

(54) METHOD FOR TREATING COMBUSTION ASH OF COAL AND METHOD FOR DESULFURIZATION

(75) Inventor: Osamu Furuya, Ichihara (JP)

(73) Assignee: Idemitsu Kosan Co., Ltd., Tokyo (JP)

( * ) Notice: Subject to any disclaimer, the term of this patent is extended or adjusted under 35 U.S.C. 154(b) by 0 days.

(21) Appl. No.: 09/869,156

(22) PCT Filed: Oct. 31, 2000

(86) PCT No.: PCT/JP00/07663

§ 371 (c)(1),
(2), (4) Date: Jun. 25, 2001

(87) PCT Pub. No.: WO01/32324

PCT Pub. Date: May 10, 2001

(30) Foreign Application Priority Data

Nov. 4, 1999 (JP) ............................................. 11-314092

(51) Int. Cl.[7] .............................. F23B 7/00; F23J 15/00; F23L 7/00

(52) U.S. Cl. ....................... 110/342; 110/345; 110/347; 110/348

(58) Field of Search ................................. 110/342, 343, 110/344, 345, 346, 347, 348; 405/128.5, 128.55, 128.6, 128.75, 128.8, 128.85

(56) References Cited

U.S. PATENT DOCUMENTS

| | | | |
|---|---|---|---|
| 3,861,930 A | | 1/1975 | Lin |
| 4,279,873 A | * | 7/1981 | Felsvang et al. |
| 4,370,161 A | * | 1/1983 | Turkdogan ..................... 75/34 |
| 4,387,653 A | * | 6/1983 | Voss ........................... 110/342 |
| 4,411,879 A | * | 10/1983 | Ehrlich et al. |
| 4,603,037 A | * | 7/1986 | Yoon |
| 4,629,721 A | * | 12/1986 | Ueno ........................... 502/411 |
| 4,737,356 A | * | 4/1988 | Ohara et al. |
| 5,270,015 A | * | 12/1993 | Rochelle et al. |
| 5,350,549 A | * | 9/1994 | Boyle ........................... 264/40.4 |
| 5,364,572 A | * | 11/1994 | Wu et al. ..................... 264/40.1 |
| 5,814,288 A | * | 9/1998 | Madden et al. |
| 6,054,074 A | * | 4/2000 | Wu et al. ..................... 264/37.29 |
| 6,250,235 B1 | * | 6/2001 | Oehr et al. |

FOREIGN PATENT DOCUMENTS

| | | |
|---|---|---|
| JP | 56-97524 | 8/1981 |
| JP | 60-6908 | 1/1985 |
| JP | 8-166110 | 6/1996 |
| JP | 8-199166 | 8/1996 |
| JP | 9-208276 | 8/1997 |
| JP | 11-116292 | 4/1999 |

* cited by examiner

Primary Examiner—Ira S. Lazarus
Assistant Examiner—K. B. Rinehart
(74) Attorney, Agent, or Firm—Oblon, Spivak, McClelland, Maier & Neustadt, P.C.

(57) ABSTRACT

Provided are a method of treating coal ash by mixing it with water, in which the coal ash and water undergo a temperature difference therebetween while they are mixed; and a method of desulfurization in a coal combustion boiler system, which comprises mixing coal ash that has been separated from a ash collector in the system, with water on the condition that the two undergo a temperature difference therebetween while they are mixed, and circulating the resulting mixture that serves as a desulfurizing agent into the coal combustor in the system. The desulfurization capability of the desulfurizing agent used in the desulfurization method is higher than that of the desulfurizing agent obtained through hydration of coal ash with water or steam.

8 Claims, 1 Drawing Sheet

METHOD FOR TREATING COMBUSTION ASH OF COAL AND METHOD FOR DESULFURIZATION

TECHNICAL FIELD

The present invention relates to a method for treatment of coal ash (combustion ash of coal), precisely to production of a desulfurizing agent and a soil improver through mixing treatment of coal ash with water, and to a method of desulfurization with the desulfurizing agent in a coal combustor.

BACKGROUND ART

Exhaust gas from a coal combustion boiler generally contains from 100 to 2,000 ppm (by volume) of harmful substances such as sulfur oxides. As they cause acid rain and photochemical smog, it is desired to effectively treat them. Heretofore, a dry process such as an activated charcoal process, and a wet process such as a lime-gypsum process have been developed. However, the dry process is problematic in that the ratio of removal of harmful substances could not be increased therein. In the wet process, the ratio of removal of harmful substances is high, but this is problematic in that the treatment of waste water is difficult and the equipment costs and the running costs are high.

To solve the problems, desired is a desulfurization process in which the ratio of removal of harmful substances is high and which can be run at low costs, not producing waste water. Therefore, for desulfurization in coal combustion boilers, <1> a semi-dry process of spraying slaked lime or its slurry into exhaust gas, <2> a dry process of atomizing limestone into high-temperature gas in a gas duct, and <3> a dry process of directly feeding limestone into a combustor have been proposed, apart from the processes mentioned above. When compared with the activated charcoal process and the lime-gypsum process, these processes are good as the equipment costs and the running costs for them are low, but are still problematic in that the ratio of removal of harmful substances therein is not always high.

In particular, the processes <1> and <2> are problematic in that the time for contact of exhaust gas with the desulfurizing component could not be prolonged therein. Therefore, the process <3> of feeding limestone into a combustor, especially into a fluidized-layer or fluidized-bed combustor is now considered good. Specifically, for boiler systems capable of efficiently burning coal therein, for example, circulation-type, coal combustion boilers equipped with a fluidized-bed combustor have been put into practical use, in which the fluidized bed is formed of relatively large-size grains.

The coal combustion boiler of the type equipped with a fluidized-bed combustor is described with reference to a conceptual view showing it. FIG. 1 is a conceptual explanatory view showing a fluidized bed-type, coal combustion boiler for one embodiment of the desulfurization method of the present invention. The fluidized bed-type, coal combustion boiler comprises a fluidized-bed combustor 1 having a fluidized bed 2 in its part; a cyclone 3 for separating particulates from the waste gas from the combustor 1; an external heat exchanger 4 for utilizing the heat of the particulates separated in the cyclone 3; and a convection-type heat-transfer unit 5.

In the combustor 1, the fluidized bed 2 is formed of, for example, gravel of from 10 to 20 mm or so in size; and a desulfurizing agent such as limestone is fed along with coal into the fluidized bed via a feed port 7. Below the fluidized bed 2, air is fed into the combustor via a primary air introduction port 8, with which the coal in the combustor is burned up. Burnt ash and carbon and other small grains of limestone and ground gravel are moved to the cyclone 3. The small grains are separated in the cyclone 3, and drop down into the external heat exchanger 4 disposed below the cyclone 3.

The small grains, of which the heat is recovered in the heat exchanger 4, are circulated back to the fluidized bed 2. The high-temperature gas having been separated from the small grains in the cyclone 3 is led into the convention-type heat-transfer unit 5, in which the gas heats water in the heat-transfer tube 10 to produce steam, and is thereby cooled. Then, the gas is led into a bag filter 6, in which fine particulates in the gas are trapped, and the gas with no particulates is discharged out of the system.

The coal ash thus trapped in the bag filter (ash collector) is referred to as "bag ash", and this fine particulates having a size of a few microns and scattering. In general, therefore, water is added thereto. Thus wetted, this is discarded or utilized for land reclamation, or a part of it is utilized for cement. However, the location of coal combustion boiler plants is not always near to the location for land reclamation or to the location of cement factories, and utilizing the coal ash for land reclamation or for cement is problematic in that the costs for transporting it are high. On the other hand, utilizing the coal ash for other building materials, for example, for cement aggregate and roadbed materials is investigated. However, since the composition of the coal ash is not always constant, the quality control thereof for such building materials is difficult. At present, therefore, the practical use of the coal ash is limited.

In coal combustion boilers, limestone is added to the fluidized bed in the combustor along with coal thereto, for absorbing sulfur dioxide ($SO_2$) from the burned coal. Therefore, the coal ash contains about 10 to 40% by weight of the ash component derived from the limestone. Of the limestone-derived ash component, calcium having trapped sulfur dioxide therein is generally about 30% by weight. In the other part of the ash component, the limestone has absorbed sulfur dioxide only in its surface and has been solidified to be gypsum ($CaSO_4$), but inside the gypsum, the limestone ($CaCO_3$) is heated and converted into quick lime (CaO), or that is, this is kept unreacted.

Therefore, it is undesirable to use the unreacted lime-containing, coal ash for land reclamation as it is, from the viewpoint of natural resources saving and cost reduction. In addition, it is well known that, when water is added thereto, the unreacted quick lime is hydrated to form calcium hydroxide ($Ca(OH)_2$) with suddenly generating great heat and much expanding. Therefore, taking advantage of this knowledge, various methods have been proposed for recycling the unreacted lime-containing, coal ash.

For example, for the fluidized bed-type, coal combustion boiler as in FIG. 1, <1> Japanese Patent Laid-Open No. 166110/1996 has proposed a method of recycling the combustion ash from the fluidized-bed combustor, which comprises a step of kneading and solidifying the ash having been collected after the cyclone, with water or with water and a cement-type solidifier, a step of grinding the resulting solid into grains, and a step of circulating the grains into the combustor; and <2> Japanese Patent Laid-Open No. 42614/1997 has proposed a method of recycling the combustion ash from the fluidized-bed combustor, which comprises a first step of wetting the combustion ash having been collected in a bag filter, with mixing and stirring it for hydration to thereby convert it into re-activated ash, a second step of drying the re-activated ash, and a third step of circulating the dried, re-activated ash into the combustor.

On the other hand, <3> Japanese Patent Laid-Open No. 35827/1986 has proposed a different method of purifying exhaust gas according to a dry lime process, which comprises leading the particulates having been separated from combustion ash in a bag filter into a classifier where the particulates are classified into a group of coarse, large-size particulates containing fly ash, and a group of fine, small-size particulates containing lime particles of which the surface has been compounded with a harmful acid substance to form a shell to cover each particle, then hydrating the lime particles in the group of fine particulates, with steam to break and remove their shells owing to their volume expansion through hydration, to thereby make them have non-reacted lime exposed out of their surface to form recycled lime particles, and circulating the recycled lime particles into exhaust gas.

In these methods, the gypsum layer formed around the lime particles through the reaction of sulfur oxides with lime in the coal ash is broken by hydration of lime, or that is, the hydration of lime is efficiently utilized therein. Accordingly, in these methods, the final desulfurizing agent suitable to the site where it is fed into the coal combustion boiler system and to the unit via which it is fed thereinto is produced and circulated in the system thereby to ensure efficient desulfurization therein and to reduce the coal ash from the system.

However, having investigated and evaluated the capabilities of the desulfurizing agent formed through hydration of coal ash with water or steam, I, the present inventor has found that the degree of desulfurization with the desulfurizing agent is not high. Therefore, it is believed that the desulfurization method for the coal combustion boiler system of using the desulfurizing agent formed through hydration of coal ash with water or steam could not be put into practical use. Accordingly, the present invention is essentially for providing a method of treating coal ash that makes it possible to recycle (circulate) the treated ash as a desulfurizing agent in a coal combustion boiler system, and providing a desulfurization method for a coal combustion boiler system.

DISCLOSURE OF THE INVENTION

To solve the above-mentioned problems in the related art, I, the present inventor has assiduously studied the process of treating the coal ash that contains a limestone-derived component, for making the treated ash recyclable as a desulfurizing agent in the process, and, as a result, has found that the condition for hydration in the process has a significant influence on the capability of the treated ash for desulfurization. On the basis of this finding, the inventor has completed the present invention.

Specifically, the invention includes the following:

1. A method of treating coal ash that contains a limestone-derived component, by mixing it with water, which comprises mixing the coal ash with water on a condition that the coal ash and water undergo a temperature difference therebetween while they are mixed.

2. The method of treating coal ash of above 1, wherein the temperature difference is at least 30° C.

3. The method of treating coal ash of above 1 or 2, wherein coal ash at a temperature falling between 80 and 150° C. is mixed with water at a temperature falling between 2 and 50° C.

4. The method of treating coal ash of above 1 or 2, wherein coal ash at room temperature is mixed with hot water at a temperature falling between 60 and 98° C.

5. The method of treating coal ash of any of above 1 to 4, wherein 100 parts by weight of coal ash is mixed with from 20 to 200 parts by weight of water.

6. The method of treating coal ash of any of above 1 to 5, wherein the mixture of coal ash and water has a mean grain size of from 0.1 to 20 mm.

7. A desulfurizing agent comprising the mixture of coal ash and water obtained in the treating method of any of above 1 to 6.

8. A soil improver comprising the mixture of coal ash and water obtained in the treating method of any of above 1 to 6.

9. A method of desulfurization in a coal combustion boiler system, which comprises mixing coal ash that has been separated from a ash collector in the system and contains a limestone-derived component, with water on the condition that the two undergo a temperature difference therebetween while they are mixed, and feeding the resulting mixture that serves as a desulfurizing agent into the coal combustor in the system.

1. A method of desulfurization in a coal combustion boiler system, which comprises mixing coal ash that has been separated from a ash collector in the system and contains a limestone-derived component, with water on the condition that the coal ash at a temperature falling between 80 and 150° C. is mixed with water at a temperature falling between 2 and 50° C., and circulating the resulting mixture that serves as a desulfurizing agent into the coal combustor in the system.

2. A method of desulfurization in a coal combustion boiler system, which comprises mixing coal ash that has been separated from a ash collector in the system and contains a limestone-derived component, with water on the condition that the coal ash at room temperature is mixed with hot water at a temperature falling between 60 and 80° C., and circulating the resulting mixture that serves as a desulfurizing agent into the coal combustor in the system.

12. The desulfurization method of any of above 9 to 11, wherein 100 parts by weight of coal ash is mixed with from 20 to 200 parts by weight of water.

13. The desulfurization method of any of above 9 to 12, wherein the mixture of coal ash and water having been so mixed that the temperature difference therebetween is at least 30° C. and having a mean grain size of from 0.1 to 20 mm serves as a desulfurizing agent.

Figure 1:
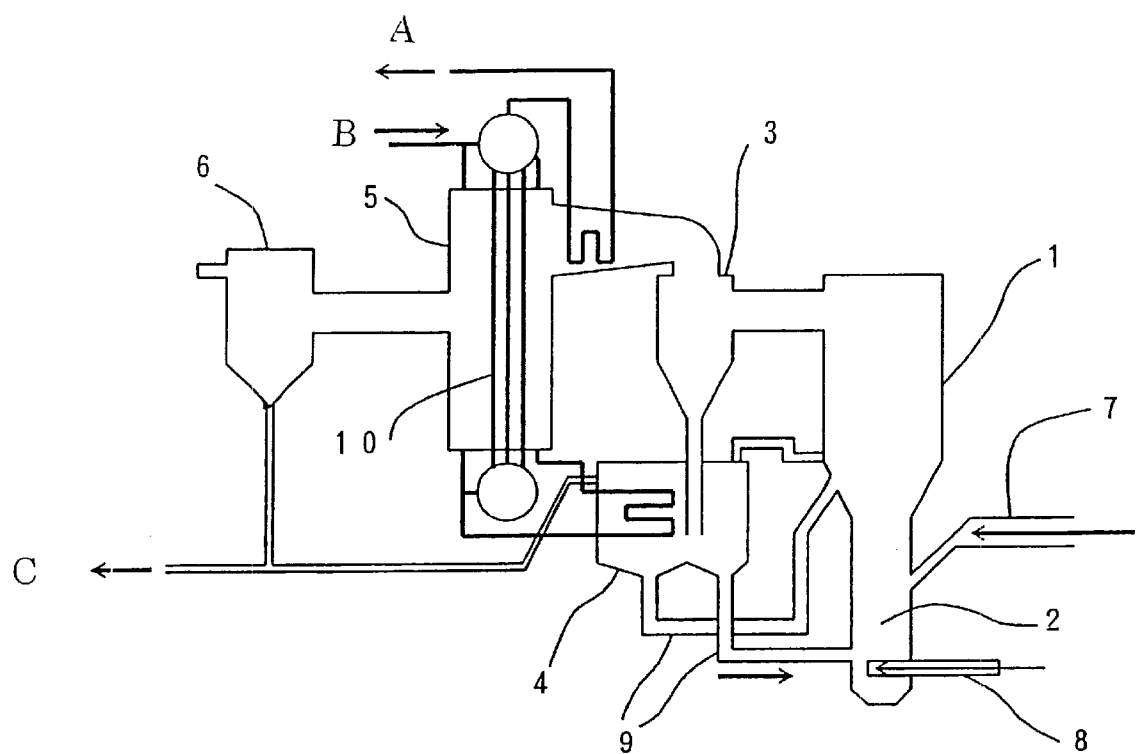
FIG. 1 is a conceptual explanatory view showing a fluidized bed-type, coal combustion boiler for one embodiment of the desulfurization method of the invention. The reference numerals and signs are as follows.

1: Fluidized-bed combustor
2: Fluidized bed
3: Cyclone
4: External heat exchanger
5: Convection-type heat-transfer unit
6: Bag filter
7: Coal feed port
8: Primary air introduction port
9: Pipe line
10: Heat-transfer duct
A: Steam
B: Water
C: Coal ash

BEST MODES OF CARRYING OUT THE INVENTION

The invention is described in detail hereinunder.

The method of treating coal ash of the invention comprises mixing coal ash that contains a limestone-derived component, with water, in which the coal ash and water undergo a temperature difference therebetween while they are mixed. The coal ash is one derived from coal, limestone serving as a desulfurizing agent and regenerated combustion ash, by burning them in the combustor in a coal combustion boiler system, and this is after the cyclone, especially after the bag filter in the system.

As so mentioned hereinabove, the coal ash contains in addition to the ash of combustion coal, about 30% by weight of the limestone-derived component and a small amount of carbon. The temperature difference between the coal ash and water while the two are mixed is preferably at least 30° C., more preferably at least 50° C., even more preferably at least 60° C. The temperature difference is preferably larger, as the capability of the resulting mixture for desulfurization is higher. For the temperature difference between the two, the temperature of any one of the coal ash and water is kept higher. Preferably, the temperature of the coal ash is kept higher, for example, falling between 80 and 150° C., more preferably between 100 and 130° C., and the temperature of water is kept lower than it at least by 30° C., more preferably at least by 50° C., for example, falling between 2 and 50° C. For example, the high-temperature, coal ash having been taken out of the bag filter (ash collector) in a coal combustion boiler system may be directly mixed with room-temperature water. In this method, the energy loss can be reduced, and the working efficiency can be increased, and, in addition, the desulfurization capability of the resulting mixture can be enhanced. On the other hand, it is also desirable to use hot water heated at a high temperature, in view of the working efficiency, the temperature control and the handlability in the method. Preferably, the temperature of hot water is higher than that of cold ash by at least 30° C., more preferably it falls between 60 and 98° C., even more preferably between 70 and 98° C.

In the invention, the temperature difference is in the initial stage of mixing the two, ash and water, and the temperature difference between the two in the initial mixing stage is a matter of importance. The amount of water to be mixed with the coal ash is not specifically defined, and it is not smaller than the amount of water enough for hydration of quick lime in the coal ash to convert it into calcium hydroxide. However, the combustion ash contains, in addition to the limestone-derived component, a large amount of coal-derived, combustion ash component. Therefore, in consideration of the water absorption of the coal-derived ash component, the amount of water to be mixed with the combustion ash preferably falls between 20 and 200 parts by weight, more preferably between 30 and 150 parts by weight, relative to 100 parts by weight of the combustion ash. The amount of water may be determined in consideration of the miscibility of the ash with water, the ability of quick lime in the ash to be hydrated with water, the grain size of the treated mixture and the post treatment of the mixture.

In case where the treated ash is used as a desulfurizing agent as in the embodiment to be mentioned hereinafter, it may be desirable that the treated ash is controlled to be grains having a grain size of from a few mm to a few cm. For this, if the lime content of the coal ash is small, the treated ash could not well cure into grains. If so, from 1 to 10 parts by weight of a cement-type solidifier may be added to the treated ash to cure it into grains having suitable mechanical strength.

In the method of treating coal ash with water of the invention, the ash and water undergo a temperature difference between them while they are mixed. The resulting mixture can be used as a desulfurizing agent, and its capability for desulfurization is high. Though not clear, the capability of the mixture for desulfurization may be increased because of the following reasons: Breaking the gypsum layer formed around the lime particles of coal ash may be accelerated by the thermal shock on the surfaces of the particles; the thermal expansion of the particles may be accelerated by the accelerated lime hydration speed; and the two effects may be combined.

The method of treating coal ash with water of the invention is characterized in that the ash and water undergo a temperature difference between them while they are mixed. The specific treatment characterized by the temperature difference significantly enhances the desulfurization capability of the resulting mixture of ash and water, which, however, could not be realized in ordinary treatment of coal ash with water with no temperature control in the two and in ordinary treatment of coal ash with steam. This will be because the surfaces of the lime particles in the ash are fully broken and the particles are fully hydrated through the temperature-controlled treatment in the method of the invention. The treated mixture of the invention may be used not only for a desulfurizing agent but also for a soil improver having the advantage of stable capabilities.

Regarding its morphology after hydration, the treated mixture of coal ash with water of the invention may be controlled in any desired manner to vary from fine particulates having a size of a few microns to large solid grains having a size of a few cm, in consideration of the object and the mode of using it. Therefore, the treated mixture of coal ash with water may be heated with stirring to thereby remove water from it; or the wet mixture may be solidified into blocks, or may be granulated into granules of a suitable size; or, if desired, the solid blocks or granules may be ground into small grains of a desired size. In addition, the blocks, the granules and the small grains may be cured to increase their mechanical strength. Having been thus cured, they may be handled more conveniently. If further desired, they may be dried to reduce their water content. In that manner, the treated mixture may be grains having a mean grain size of from 0.1 to 20 mm, more preferably from 0.2 to 5 mm.

The treated mixture obtained in the method of treating coal ash of the invention can be used as a desulfurizing agent in a coal combustion boiler system. In case where the treated mixture is ground into fine powder, it may be sprayed into the exhaust gas in a coal combustion boiler system for the purpose of desulfurization therein. However, the mixture obtained in the treating method of the invention is preferably used for desulfurization in the method mentioned below.

Specifically, in a coal combustion boiler system, the coal ash that has been separated in a bag filter and contains a limestone-derived component is mixed with water on the condition that the two undergo a temperature difference therebetween while they are mixed, and the resulting mixture that serves as a desulfurizing agent is fed into the coal combustor in the system. Accordingly, the invention further provides the desulfurization method with the mixture of coal ash with water. In the method, the desulfurizing agent of the mixture is preferably circulated into the coal combustor in the coal combustion boiler system. The temperature difference between the coal ash and water while they are mixed is preferably at least 30° C., more preferably at least 50° C., even more preferably at least 60° C. The temperature difference is preferably larger, as the capability of the desulfurizing agent of the mixture is higher. For the temperature difference between the two, the temperature of any one of the coal ash and water is kept higher. Preferably, the temperature of the coal ash is kept higher, for example, falling between 80 and 150° C., more preferably between 100 and 130° C., and the temperature of water is kept lower than it at least by 30° C., more preferably at least by 50° C., for example, falling between 2 and 50° C. For example, the high-temperature, coal ash having been taken out of the bag filter in the coal combustion boiler system may be directly mixed with room-temperature water. In this method, the energy loss can be reduced, and the working efficiency can be increased, and, in addition, the desulfurization capability of the resulting mixture can be enhanced. On the other hand, it is also desirable to use hot water heated at a high temperature, in view of the working efficiency, the temperature control and the handlability in the method. Preferably, the temperature of hot water is higher than that of cold ash by at least 30° C., more preferably it falls between 60 and 98° C., even more preferably between 70 and 98° C.

The temperature condition as above is preferred in view of the thermal shock owing to the temperature difference between the coal ash and water, and of the hydration speed of lime in the ash. In the coal combustion boiler system, the coal combustor may have a fixed layer or a fixed bed. The method of the invention is applicable to any type of coal combustors.

Preferably, the desulfurizing agent is dried to be slaked lime having a mean grain size of from 0.1 to 20 mm or so. Its grain size is so selected that the dried desulfurizing agent well fits with the power and the function of the coal combustor into which it is fed, in order that the desulfurizing agent can well stay in the fluidized layer or bed of the combustor to ensure its residence time therein. The desulfurizing agent may be dried in combustors, as it is heated therein. However, in consideration of the easiness in its storage, transportation, and supply to combustors, it is desirable that the desulfurizing agent is previously dried.

In the desulfurization method of the invention, the high-temperature (80 to 150° C.) coal ash having been collected essentially from a bag filter is mixed with room-temperature (about 2 to 50° C.) water by stirring them. Alternatively, the coal ash having been collected essentially from a bag filter is cooled, and the cold (room-temperature) ash is mixed with hot water at about 60 to 98° C. by stirring them. Through the treatment, the shell of ash gypsum formed around lime particles in the mixture is broken, whereby the inner quick lime is rapidly hydrated to expand, while generating much heat. The mixture is further stirred, and the lime particles therein are hydrated further, and their hydration will finish in around 20 to 90 minutes. In this treatment, the pre-treatment of breaking the gypsum shell around the lime particles in the mixture may be effected almost simultaneously with the hydration of the lime particles. The hydration is essentially for breaking the gypsum (calcium sulfate) shell formed around the lime particles through reaction of lime with sulfur dioxide in coal ash, to thereby expose the inner active quick lime outside the thus-broken lime particles, and not merely for ordinary hydration only. Accordingly, the mixture of coal ash with hot water expands and generates much heat through hydration, and after having been thus hydrated, it is readily solidified. In general, the thus-solidified mixture is cured so that its mechanical strength could be in some degree. The solid may be ground in a mill into grains having a mean grain size of at most 20 mm. The grains may have a mean grain size of from 0.3 to 10 mm or so.

The desulfurizing agent thus obtained in the manner as above is fed into the combustor in a coal combustion boiler system as in FIG. 1, via the coal feed port 7, generally along with coal conveyed thereinto on a conveyor. The coal and the desulfurizing agent thus fed into the combustor are heated at around 800° C. in the fluidized layer of the combustor. In the desulfurization method of the invention, the desulfurizing agent of the regenerated coal ash may be used alone, but it may be combined with fresh limestone. The amount of the desulfurizing agent to be used may be determined, based on the sulfur oxide content of exhaust gas and on the active lime content of the desulfurizing agent. For example, the molar ratio Ca/S may fall between 1.5 and 5 or so, preferably between 2 and 4 or so. The desulfurizing agent is solid, and all of it could not act for desulfurization. Therefore, some excess amount of the desulfurizing agent must be used.

The mixture obtained by treating coal ash with water in the method of the invention is favorably used as a desulfurizing agent in coal combustion boilers, as so mentioned hereinabove. The coal ash treated according to the method of the invention is well hydrated, or that is, the lime component of the ash is well converted into calcium hydroxide, and the quality of the hydrated ash is stable. Accordingly, the treated mixture can be used as a soil improvers for neutralizing, thickening and solidifying soil in treatment of sludge, treatment of acidic soil, and treatment of desert soil. In addition, the treated mixture can be used in other various fields of, for example, construction materials and building materials.

The invention is described concretely with reference to Examples, Comparative Examples and Reference Examples, which, however, are not intended to restrict the scope of the invention.

Example 1, Comparative Examples 1 and 2, Reference Examples 1 to 3; Experiment I:

Treatment of Coal Ash

Combustion ash (having a calcium compound content of about 23% by weight) was collected in a bag filter in a fluidized bed-type coal combustion boiler. This was mixed with water in the manner mentioned below.

<1> 4.6 kg of hot water at 95° C. was added to 5 kg of the coal ash at room temperature, and mixed and kneaded for 10 minutes. The resulting mixture was dried at room temperature (30° C.) and solidified. The solid was ground in a mill into grains not larger than 2 mm in size (having a mean grain size of 0.5 mm). The treated mixture is used as a desulfurizing agent.

<2> 4.6 kg of water at 25° C. was added to 5 kg of the coal ash at room temperature, and mixed and kneaded for 10 minutes. The resulting mixture was dried at room temperature (30° C.) and solidified. The solid was ground in a mill into grains not larger than 2 mm in size (having a mean grain size of 0.5 mm). The treated mixture of Comparative Example 1 is used as a desulfurizing agent.

<3> 10 kg of the coal ash at room temperature was kept contacted with steam at 150° C. for 6 hours. The thus-treated ash was dried at room temperature (30° C.), and ground into grains having a mean grain size of 0.5 mm. This is a desulfurizing agent of Comparative Example 2.

<4> This is non-treated, coal ash (having a particle size of from 10 to 20 μm). This serves as a desulfurizing agent.

<5> This is a basic desulfurizing agent, limestone grains of not larger than 1 mm in size (having a mean grain size of 0.5 mm).

<6> No desulfurizing agent is used.

Desulfurization Method; Evaluation of desulfurization capability

In a fluidized bed-type coal combustion boiler system as in FIG. 1, coal powder of at most 2 mm in size (having a mean grain size of 0.5 mm) was fed into the small-sized coal combustor having a height of 5 m, at a coal feeding rate of 4 kg/hr, and was burned therein. Prior to being fed into the combustor, the coal was mixed with any of the desulfurizing agents as above, and then fed into the combustor. The sulfur oxide concentration in the exhaust gas from the system was measured, from which was obtained the degree of desulfurization in the system. The amount of the desulfurizing agent added to coal is shown in Table 1, in terms of the ratio of Ca/S that indicates the amount of CaO in the desulfurizing agent relative to the sulfur content (S) of coal.

The test results are shown in Table 1.

The degree of desulfurization of each desulfurizing agent tested is compared with that of limestone, and is shown in Table 1 relative to the control data of limestone. It is obvious that the desulfurization capability of the regenerated desulfurizing agent of Example 1 is better than that of the comparative desulfurizing agents of Comparative Examples 1 and 2.

Example 2, Reference Examples 4 and 5; Experiment II:

Treatment of Coal Ash

Coal ash was collected in a bag filter, but this differs from that tested in Experiment I. The ash was mixed with water in the manner mentioned below.

<7> 5 kg of cold water at 28° C. was added to 5 kg of the coal ash at 120° C., and mixed and kneaded for 10 minutes. The resulting mixture was dried at room temperature (30° C.) and solidified. The solid was ground in a mill into grains not larger than 2 mm in size (having a mean grain size of 0.5 mm). This serves as a desulfurizing agent.

<8> This is a basic desulfurizing agent, limestone grains of not larger than 1 mm in size (having a mean grain size of 0.5 mm). This is the same as in the above <5>.

<9> No desulfurizing agent is used.

Desulfurization Method; Evaluation of Desulfurization Capability

The desulfurizing agents were tested in the same manner as in Experiment I for their desulfurization capability. However, the coal used in this experiment differs from that used in Experiment I.

The test results are given in Table 2.

It is understood that the desulfurization capability of the regenerated desulfurizing agent of Example 2 is high, and the degree of desulfurization with the regenerated desulfurizing agent of Example 2 is on the same level as that of desulfurization with limestone.

TABLE 1

|  | Treated Mixture (desulfurizing agent) | Amount of Desulfurizing Agent Added, Ca/S (by mol) | Sulfur Oxide Content of Exhaust Gas ppm | Degree of Desulfurization % | Desulfurization Capability (based on limestone) % |
|---|---|---|---|---|---|
| Example 1 | hydration with hot water | 1.7 | 246 | 40 | 53 |
| Comp. Ex. 1 | hydration with room-temperature water | 1.7 | 320 | 22 | 29 |
| Comp. Ex. 2 | hydration with steam | 1.7 | 275 | 33 | 44 |
| Ref. Ex. 1 | non-treated, combustion ash | 1.8 | 390 | 5 | 7 |
| Ref. Ex. 2 | limestone | 2.0 | 103 | 75 | 100 |
| Ref. Ex. 3 | none | 0 | 410 | — | — |

TABLE 2

|  | Treated Mixture (desulfurizing agent) | Amount of Desulfurizing Agent Added, Ca/S (by mol) | Sulfur Oxide Content of Exhaust Gas ppm | Degree of Desulfurization % | Desulfurization Capability (based on limestone) % |
|---|---|---|---|---|---|
| Example 2 | hydration of high-temperature ash with room-temperature water | 3 | 9 | 78 | 100 |
| Ref. Ex. 4 | limestone | 3 | 9 | 78 | 100 |
| Ref. Ex. 5 | none | 0 | 41 | — | — |

Industrial Applicability

It is obvious that the desulfurization capability of the desulfurizing agent obtained in the invention by treating coal ash with water, especially with hot water is higher than that of the desulfurizing agent obtained in conventional hydration of coal ash with water or with steam. The reason why the coal ash treated with hot water in the invention is better than that treated with steam that is hotter than hot water will be because of the following reasons. The calcium sulfate shell that covers each non-reacted calcium oxide particle can be readily broken owing to the thermal shock imparted thereto in the same manner in the two cases, but the subsequent hydration of the ash differs between the two cases. In the case of treating the ash with steam, the treatment time will be long and the treatment pressure will be high. Therefore, from the viewpoint of the equipment costs, the method of the invention is better than the conventional, steam treatment method.

The effect and the mechanism of the desulfurizing agent obtained through treatment of high-temperature coal ash with cold water are the same as above. In this case, the temperature difference between the coal ash and water can be made larger, and the desulfurization capability of the treated mixture that serves as a desulfurizing agent can be higher.

Therefore, the invention has made it possible to recycle (circulate) the combustion ash in coal combustion boiler systems, and contributes toward reducing the amount of coal ash wastes to be discarded and toward reducing the amount of limestone to be used. According to the desulfurization method and the method of producing a desulfurizing agent of the invention, the substance that covers the non-burned carbon grains in the combustion ash is broken, and, as a result, the non-burned carbon is exposed outside. Accordingly, the combustibility of the non-burned carbon in the coal ash is promoted, and the combustion efficiency in combustors is increased. In addition, even when the treated mixture is discarded, its quality is stable. Therefore, the treated mixture of the invention is useful for various soil improvers.

What is claimed is:

1. A method of desulfurization in a coal combustion boiler system, which comprises mixing coal ash that has been separated from a ash collector in the system and contains a limestone-derived component, with water on the condition that the coal ash at a temperature falling between 80 and 150° C. is mixed with water at a temperature falling between 2 and 50° C., and circulating the resulting mixture that serves as a desulfurizing agent into the coal combustor in the system.

2. A method of desulfurization in a coal combustion boiler system, which comprises mixing coal ash that has been separated from a ash collector in the system and contains a limestone-derived component, with water on the condition that the coal ash at room temperature is mixed with hot water at a temperature falling between 60 and 80° C., and circulating the resulting mixture that serves as a desulfurizing agent into the coal combustor in the system.

3. A method of desulfurization in a coal combustion boiler system, which comprises mixing coal ash that has been separated from an ash collector in the system and contains a limestone-derived component, at a temperature, with water at a different temperature, and feeding the resulting mixture that serves as desulfurizing agent into the coal combustor in the system, wherein 100 parts by weight of coal ash is mixed with from 20 to 200 parts by weight of water.

4. A method of desulfurization in a coal combustion boiler system, which comprises mixing coal ash that has been separated from an ash collector in the system and contains a limestone-derived component, at a temperature, with water at a different temperature, and feeding the resulting mixture that serves as desulfurizing agent into the coal combustor in the system, wherein the mixture of coal ash and water having been so mixed that the temperature difference therebetween is at least 30° C. and having a mean grain size of from 0.1 to 20 mm serves as a desulfurizing agent.

5. The desulfurization method as claimed in claim 1, wherein 100 parts by weight of coal ash is mixed with from 20 to 200 parts by weight of water.

6. The desulfurization method as claimed in claim 2, wherein 100 parts by weight of coal ash is mixed with from 20 to 200 parts by weight of water.

7. The desulfurization method as claimed in claim 1, wherein the mixture of coal ash and water having been so mixed that the temperature difference therebetween is at least 30° C. and having a mean grain size of from 0.1 to 20 mm serves as a desulfurizing agent.

8. The desulfurization method as claimed in claim 2, wherein the mixture of coal ash and water having been so mixed that the temperature difference therebetween is at least 30° C. and having a mean grain size of from 0.1 to 20 mm serves as a desulfurizing agent.

* * * * *